Nov. 15, 1927.

M. VIERENGEL 1,649,760

ENVELOPE MACHINE

Filed Dec. 12, 1925

INVENTOR
Matthew Vierengel
BY
HIS ATTORNEYS

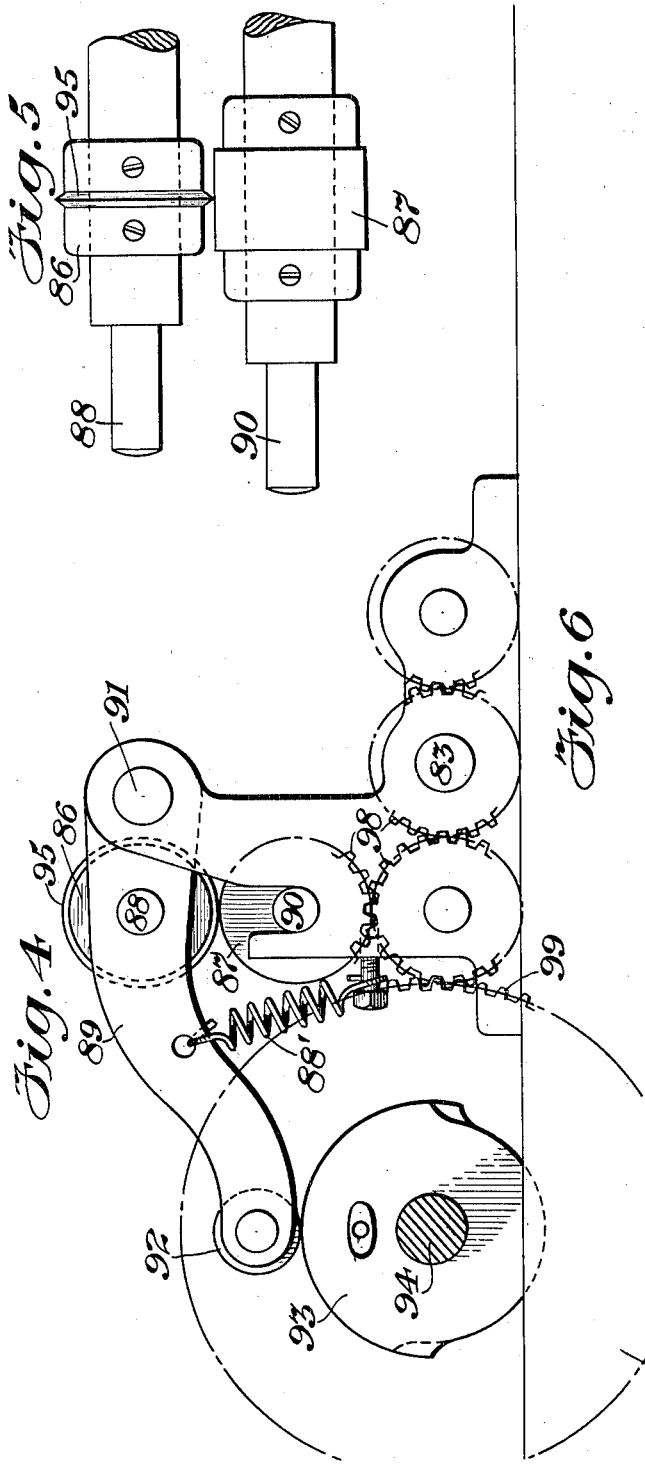
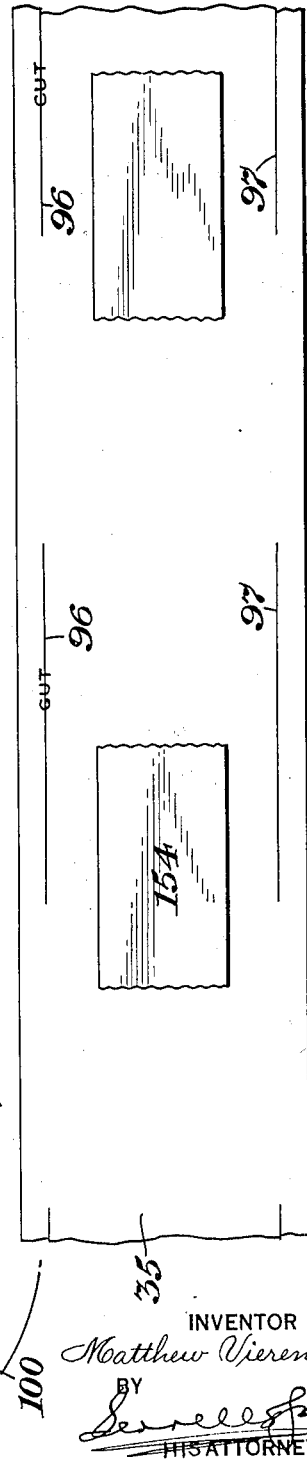

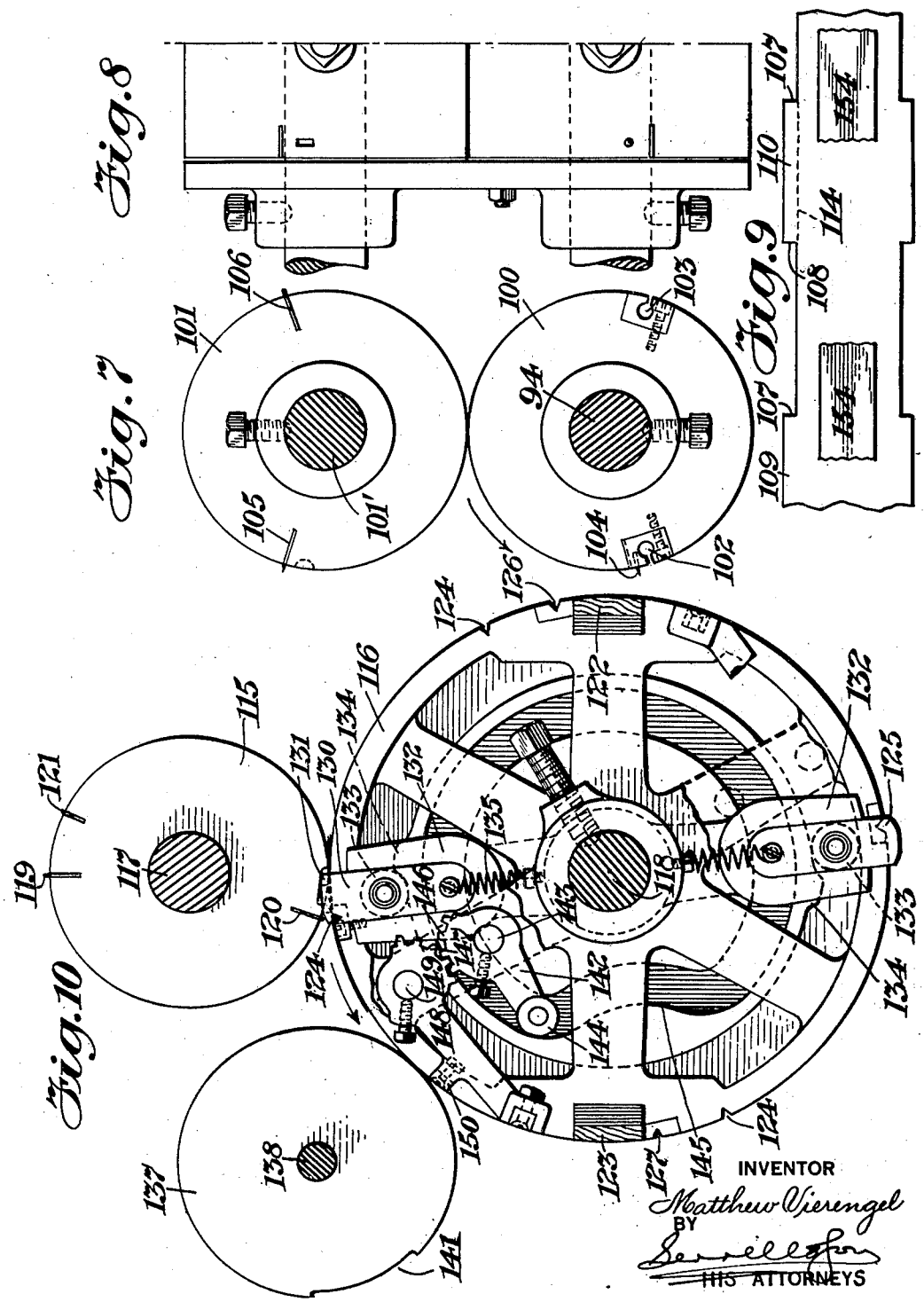

Nov. 15, 1927.  
M. VIERENGEL  
1,649,760  
ENVELOPE MACHINE  
Filed Dec. 12, 1925  
8 Sheets-Sheet 6
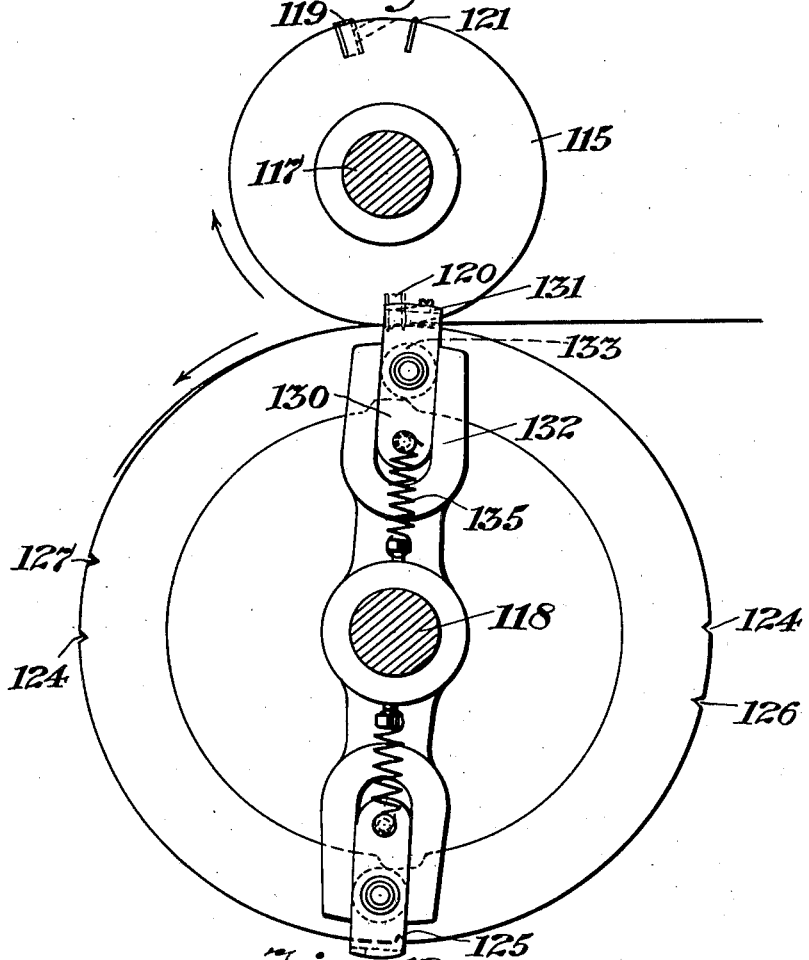
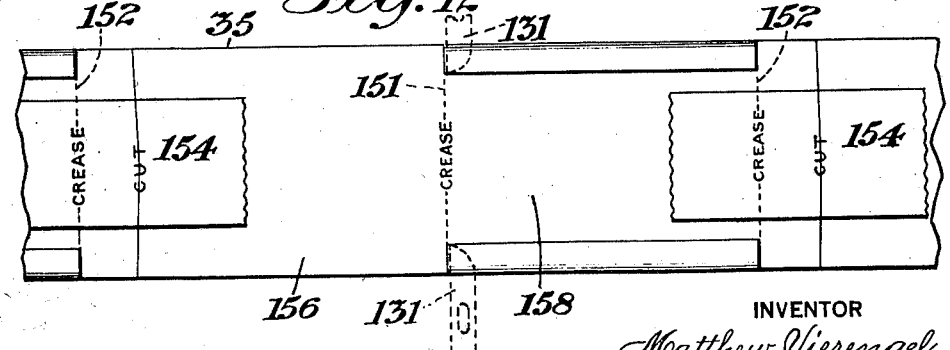
INVENTOR  
Matthew Vierengel  
BY  
HIS ATTORNEYS

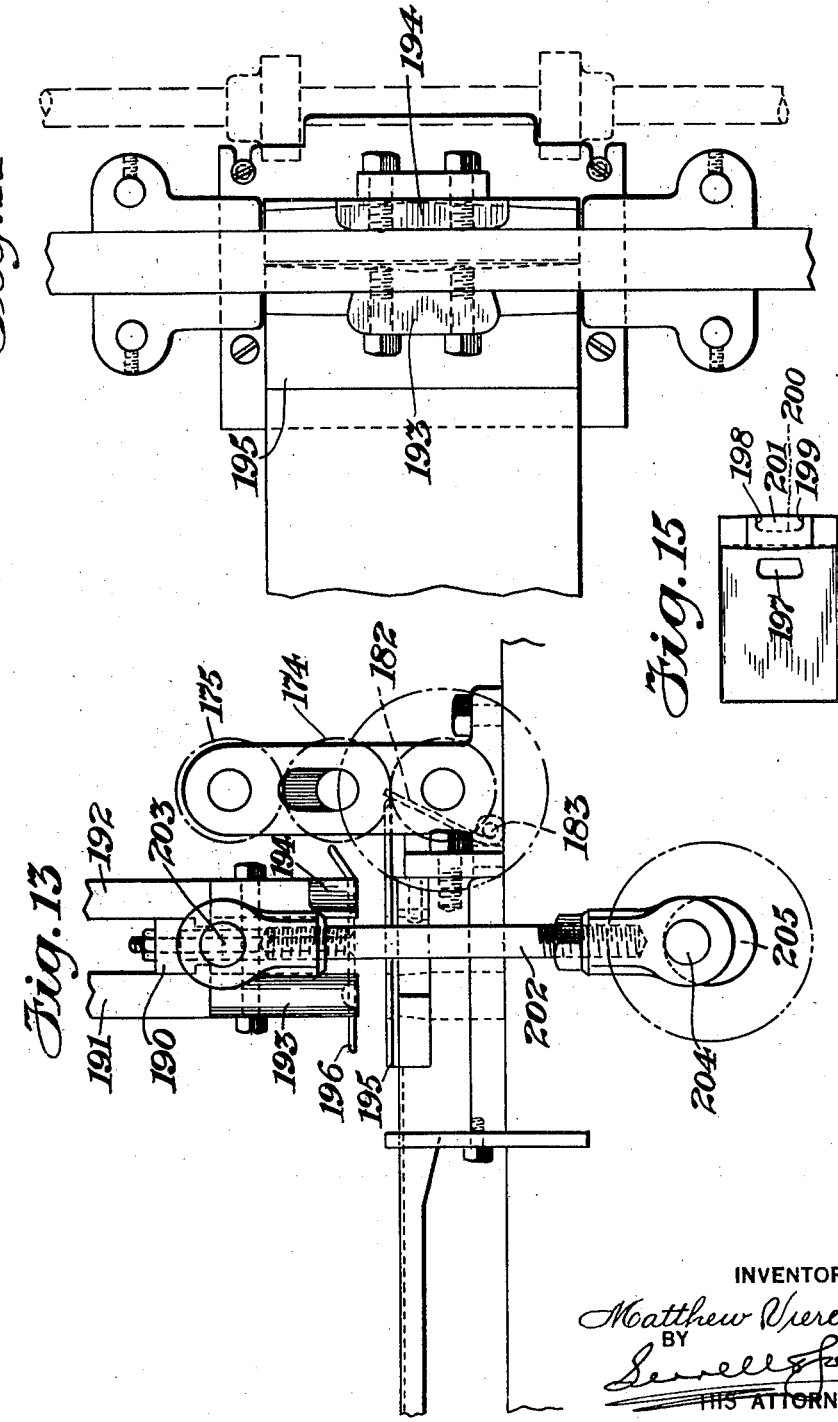

Nov. 15, 1927. 1,649,760
M. VIERENGEL
ENVELOPE MACHINE
Filed Dec. 12, 1925 8 Sheets-Sheet 8
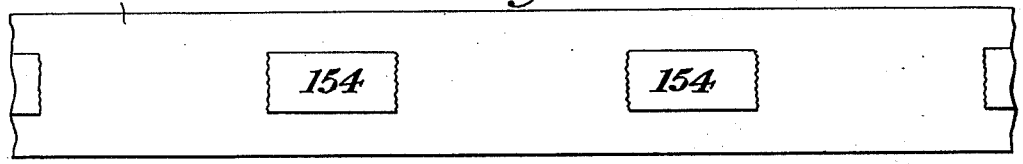
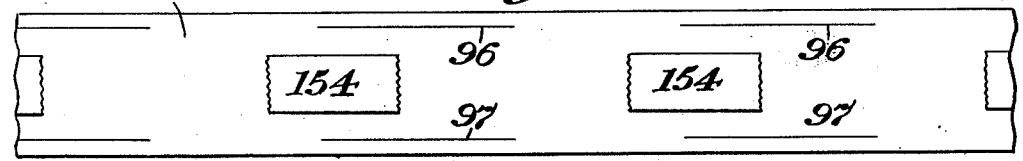
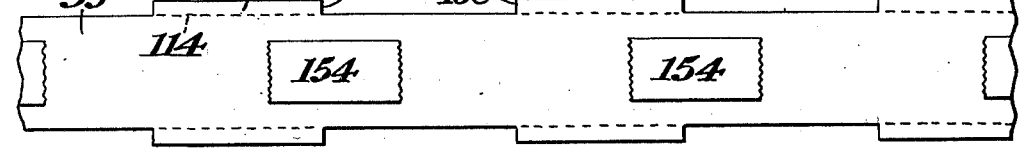
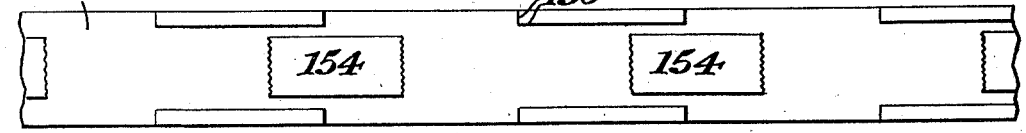
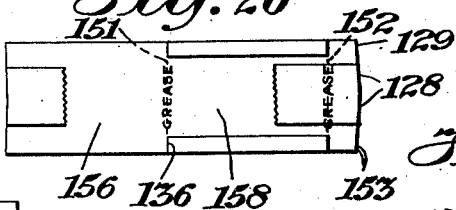
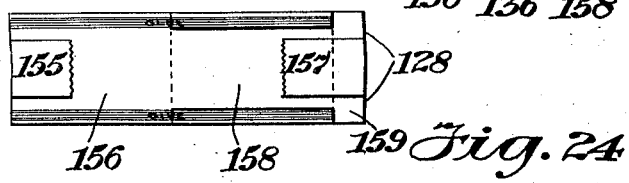
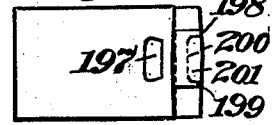
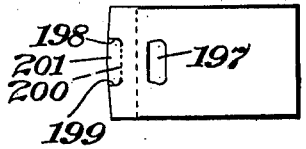
INVENTOR
Matthew Vierengel
BY
HIS ATTORNEYS Patented Nov. 15, 1927.

1,649,760

UNITED STATES PATENT OFFICE.

MATTHEW VIERENGEL, OF BROOKLYN, NEW YORK, ASSIGNOR TO M. VIERENGEL MACHINE CO. INC., OF BROOKLYN, NEW YORK, A CORPORATION OF NEW YORK.

ENVELOPE MACHINE.

Application filed December 12, 1925. Serial No. 74,975.

My present invention relates to a machine for the manufacture of envelopes or bags preferably made of paper and of the side seam type in which the article comprises an obverse member, a reverse member connected by the side seams along oppositely disposed edges, closed at one end and open at the other end at which there is a flap to close the normally opened end, and means for securing the flap in a position to close the envelope or bag.

The more important features to which the invention relates are the provision in a machine of this type of devices for simultaneously feeding material from a roll to form the article, and reinforcing material from another roll to strengthen predetermined portions of the article in which an opening is made to form a handle at the open end of the envelope, and preferably to provide a tongue in the end or closing flap which may be flexed through the opening to provide a means for maintaining the flap in its closed position. The machine also includes devices for cutting strips from the side of the stock to make provision for the seam members which are inturned by suitable folding devices, and gumming mechanism for securing the strips of reinforcing stock to the stock from which the body of the envelope is made; devices for creasing and folding the material from which the envelope is made; devices for centering the material after it has been creased and folded, and punching the handle hole therein and the tongue or other device in the flap, and also devices for taking the curl out of the stock as the same is delivered from the roll from which it is taken. The machine may also include suitable printing devices for printing one or both sides of the envelope or bag, together with various minor features all of which will be hereinafter more particularly described.

In the drawing Figure 1 is a side elevation of a machine embodying my invention.

Fig. 1ª is a partial elevation on an enlarged scale illustrating the devices for removing the curl from the paper stock.

Fig. 4 is an elevation of the devices for longitudinally cutting the stock to provide for the seam flaps.

Fig. 5 is a front elevation of the cutter knife and cutter roller as shown in Fig. 4.

Fig. 6 is a plan of the blank from which the envelopes are made showing the same after the longitudinal cuts have been made therein and the reinforcing strips applied thereto.

Fig. 7 is a sectional elevation of the cutter disks employed for making the transverse cuts at the edges of the stock, and the means by which the waste strip is removed.

Fig. 8 is a side elevation of the parts illustrated in Fig. 7.

Fig. 9 is a plan of the blank with the waste strips cut therefrom.

Fig. 10 is a sectional elevation of the devices for cutting, folding and gumming the blanks.

Fig. 11 is a sectional elevation showing in detail the gripper and the creaser and cutter mechanism.

Fig. 12 is a plan of the blank after the side seam folds have been made and the blank creased and cut.

Fig. 13 is a side elevation of the punching apparatus.

Fig. 14 is a plan of the same.

Fig. 15 is a plan of the envelope completed, but with the flap unfolded.

Fig. 16 is a plan of the blank after the reinforcing strips have been applied thereto.

Fig. 17 is a plan of the blank after the reinforcing strips have been applied thereto, and the longitudinal slits made therein.

Fig. 18 is a plan of the blank after the waste strips have been removed.

Fig. 19 is a plan of the blank after the seam flaps have been folded to position.

Fig. 20 is a plan of an envelope blank before the gum or adhesive is applied thereto.

Fig. 21 is a similar plan after the adhesive is applied.

Fig. 22 is a longitudinal section through the envelope before the parts are closed and after being folded.

Fig. 23 is a plan of the envelope completed, showing one side thereof, and

Fig. 24 is a similar view showing the other side of the envelope.

Figure 1:
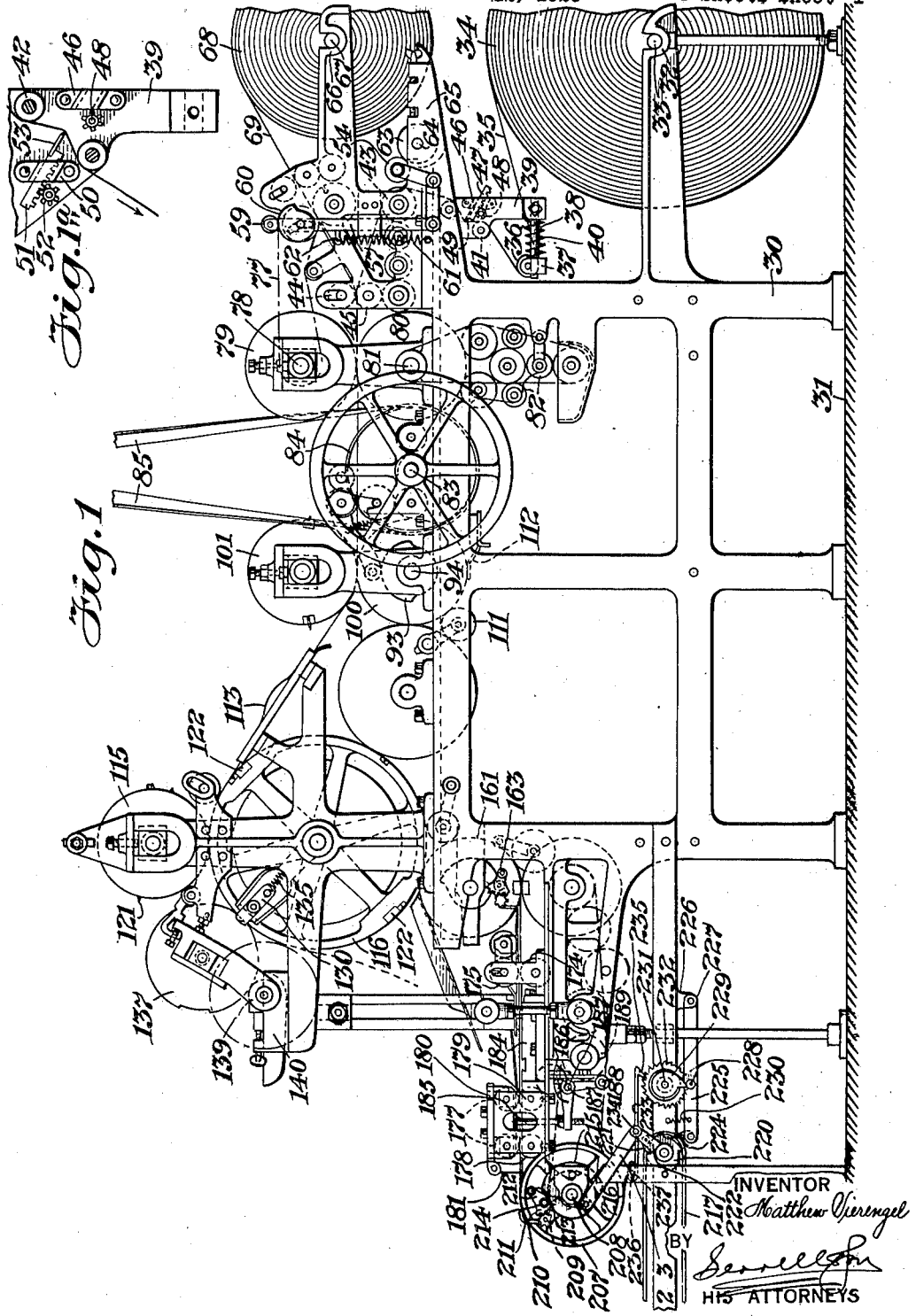

In carrying out my present invention the machine in which the same is embodied includes a frame having side members 30 connected by suitable cross bars or stays and having bases adapted to rest upon and to be secured to a suitable foundation 31 in any desired manner. At one end of the frame there is a bearing 32 adapted to receive and support the axle 33 of a roll 34 of paper stock envelope material from which the body of the envelope or bag is formed. The paper web 35 as the same is unwound from the roll 34 passes over a roller 36 which is mounted in slides 37 movable on rods 38 which are fixed in hangers 39 suitably connected to and depending from the frame of the machine. The slides 37 are normally maintained in a position spaced from the hanger 39 by springs 40 which surround the rods 38 and extend between the hangers 39 and the slides 37. This provides for a yielding action of the roller 36 depending upon the tension of the paper web in passing over the same.

Figure 2:
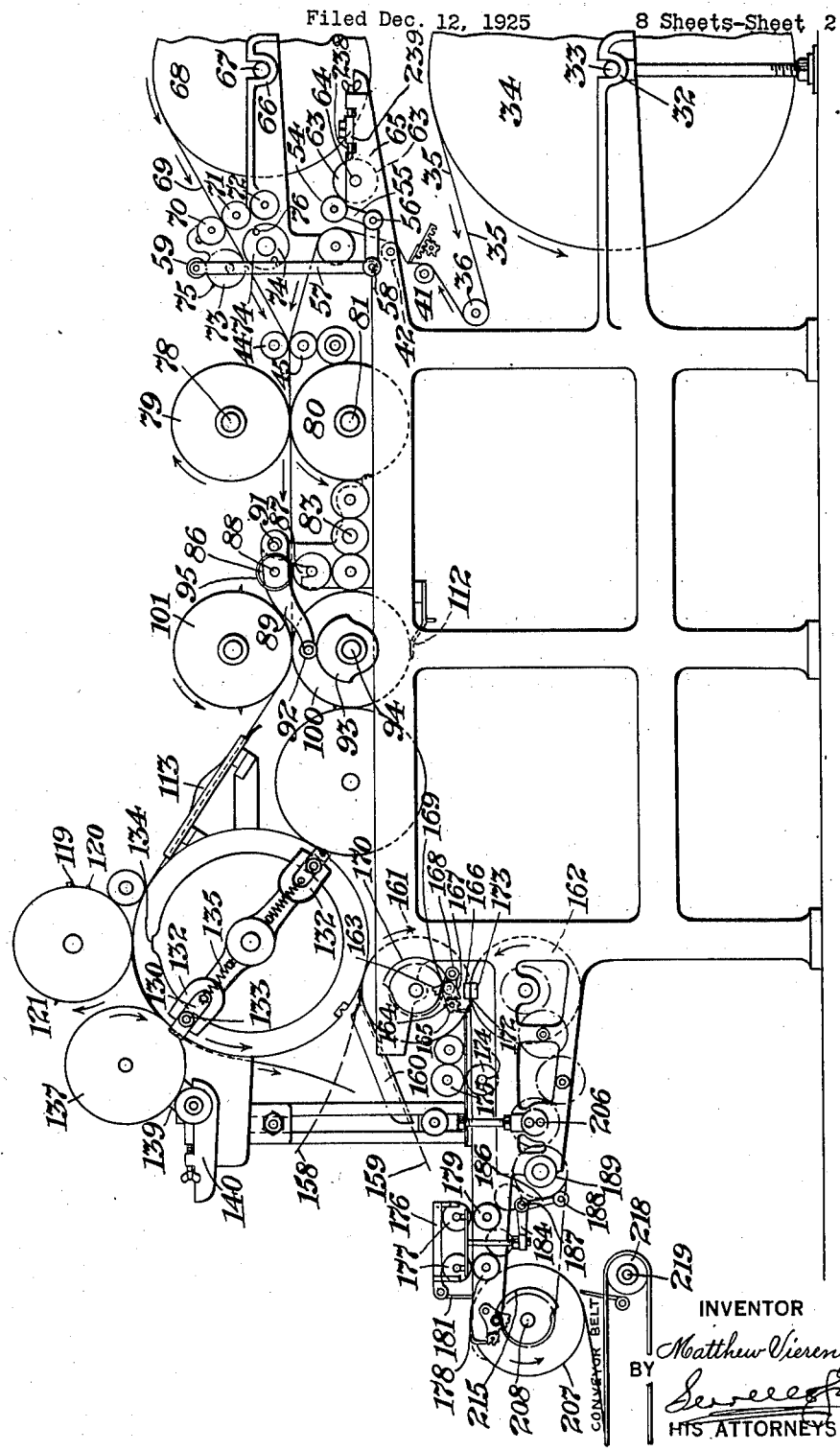
Fig. 2 is a view similar to Fig. 1 with some of the parts of the machine omitted for the purposes of illustration.

The paper web also passes over rollers 42 and 43, the shafts of which are suitably journaled in bearings provided in the frame for the same, and after passing over the roller 43 the paper web passes between feed rollers 44 and 45 which are also suitably mounted in the frame of the machine and may be actuated by any suitable driving devices. Depending upon the nature of the stock of paper, there is more or less of a tendency in the same to curl as the same leaves the roll, and in order to uncurl the paper stock or take the curl out of the same, I may employ slideways 46 in each of which a rack 47 is movable and may be set in position by turning a pinion 48. Mounted in the racks 47 is a plate 49 having a sharpened edge over which the paper web is caused to pass. As illustrated, this uncurling device is placed between the rollers 41 and 42 and as will be apparent, may be adjusted to any suitable position depending upon the amount of curl which it is necessary to remove from the paper web. By reference to Fig. 1ª it will be seen that the frame of the machine may be fitted with additional slideways 50 in which there are racks 51 each actuated by a pinion 52 so as to be adjusted to an operating position. The racks 51 are provided with a plate 53 having a sharpened edge to bear against the surface of the web to take the curl out of the same when the curl is in the opposite direction in which case of course, it is necessary to feed the web over the rollers 41 and 42 as shown in Fig. 1ª instead of beneath the rollers 41 and 42 as illustrated in Figs. 1 and 2 of the drawing.

As the paper web passes over the roller 43 a suitable adhesive such for example as glue or mucilage is applied to predetermined portions thereof in order that as hereinafter described, the reinforcing strip may be suitably secured to the envelope material. For the purpose of applying this adhesive to the paper web, and as clearly illustrated in Figs. 1, 2 and 3 of the drawing, I employ a glue roller 54 mounted at one end of bell crank levers 55 which are pivotally mounted at 56, while the ends of the said levers are pivotally connected to a link 57 as indicated at 58. At its upper or free end the link 57 carries a roller 59 bearing on a cam 60 and normally maintained in contact therewith by a suitable spring 61 or otherwise, the spring being connected at one end to the frame of the machine and at the other end to an eye 62 carried by the link 57. In its normal position the glue roller 54 contacts with a roller 63 mounted on a shaft 64 in such a position as to extend into a glue or adhesive receptacle 65 carried by the frame of the machine in order that the surface of the glue roller may be provided with the adhesive so as to transfer the adhesive to the surface of the paper web when the roller 59 runs off the high face of the cam 60 and permits the link to be moved downwardly to swing the bell crank lever from its normal position as shown in full lines in Fig. 3, to its operative position as shown in dotted lines in this figure, and in which as will be understood, the adhesive is applied to a predetermined portion of the adjacent face of the paper web as the same passes over the roller 43.

Figure 3:
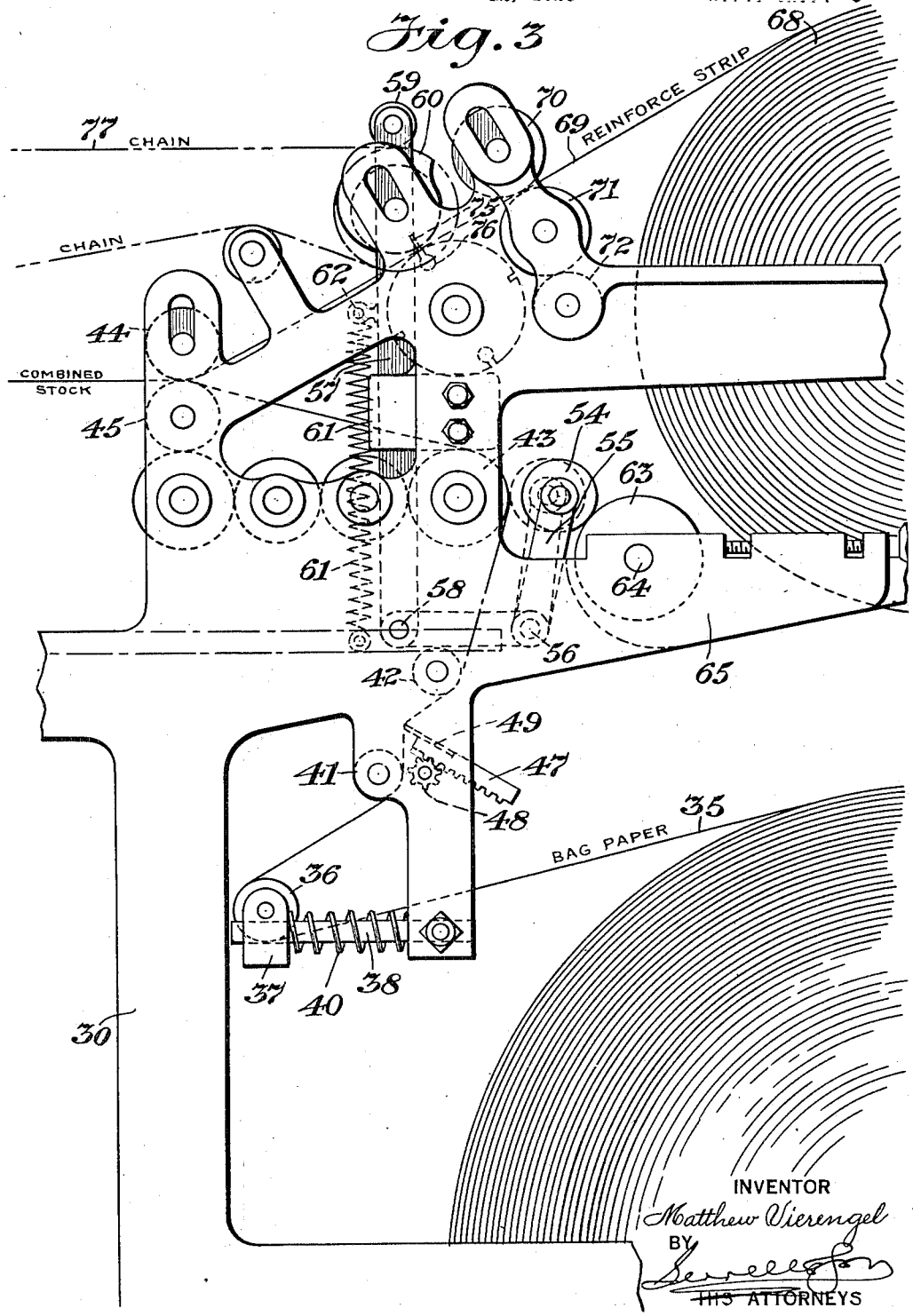
Fig. 3 is an elevation on a larger scale than Figs. 1 and 2, showing the apparatus at the end of the machine in which the rolls of stock are mounted.

At this end of the machine the frame is also provided with bearings 66 adapted to receive the axle 67 of a roll 68 of paper or other similar material from which the reinforcing strips are obtained. This is preferably of stock which is materially heavier than that from which the body of the envelopes or bags are made. The web 69 as the same is unwound from the roll 68 passes through suitable feed rollers 70 and 71 which may be actuated from a drive roller 72 or otherwise, so as to cause this web to travel at a materially slower speed than that of the web 35. After passing between the feed rollers 70 and 71 the web 69 of the reinforcing stock passes between the cutter rollers 73 and 74, the roller 73 being provided with a knife 75 and the roller 74 with a slot 76 cooperating with the edge of the knife 75 to suitably sever the web 69 into the required length for the reinforcing strips as will be hereinafter more particularly described. The cutter rollers and the feed rollers for the web 69 may be actuated from a chain or belt 77 passing around suitable sprockets or pulleys and driven from a shaft 78 or otherwise. As indicated in Figs. 1, 2 and 3 of the drawing, the web 69 is passed to the feed rollers 44 and 45 so as to unite with the web 35 in passing between these feed rollers, and it will be understood that the adhesive applied by the glue roller 54 is so placed on the adjacent face of the web 35 that it is substantially coextensive with the area of the reinforcing strip and is applied in such a position that the reinforcing strip coincides therewith, so that in passing between the feed rollers each successive reinforcing strip is caused to adhere to the adjacent surface of the web 35. It will furthermore be understood that in feeding the web 69 the cut is made therein at substantially the same time or immediately after the forward end of the web reaches the position in which it is engaged by the feed rollers 44 and 45. Obviously also, the rate at which the web 69 travels is materially slower than that at which the web 35 travels, the rate of travel depending upon the nature of the article to be manufactured and the resultant required length of the reinforcing strip.

The machine may also be provided with printing cylinders 79 and 80, the former being mounted on the shaft 78, and the latter on a suitably journaled shaft 81. These printing cylinders are provided with a series of inking rollers 82. The paper web is passed between the printing cylinders after leaving the feed rollers 44 and 45, and as will be understood, the printing cylinders may be fitted with plates or type in order to print on either side of the traveling web and in any desired position thereon.

Approximately in a central position in the machine, there is a shaft 83 which may be considered the main shaft or drive shaft. On this shaft there is a pulley 84 and the pulley and the shaft are driven by a belt 85. It will be understood that the necessary gearing or other connections are provided between the drive shaft 83 and the other operating parts of the mechanism. This gearing or other connections is a matter of design and is not illustrated in detail in the drawings.

After passing between the printing cylinders 79 and 80, the traveling web of paper is carried to rollers which provide longitudinally disposed slits of predetermined length and at regular intervals adjacent the edges of the web. These slitting rollers are indicated at 86 and 87. Each of the rollers 86 is mounted on a shaft 88 and journaled in a lever 89. The roller 87 is mounted on a shaft 90 journaled in a bearing provided therefor in the frame of the machine. Each lever 89 is pivotally mounted as indicated at 91 in the frame of the machine, and at its opposite end carries a cam roller 92 adapted to bear against the face of a cam 93 suitably mounted on a shaft 94 which is also journaled in a bearing provided therefor in the frame of the machine. Each roller 86 is provided with a circular knife 95. As the web travels between these slitting rollers the same cut slits 96 and 97 therein as indicated in Fig. 6 of the drawing, the circular cutting knives being brought into play at regular intervals to determine the length of the slits 96 and 97 by means of the cooperation between the levers 89 and the cam 93, together with a spring 88' which maintains the levers in that position in which the cam roller 92 is always in contact with the cam 93. These parts of the machine are driven through the sets of gears 98 and 99. This like other gearing connections is merely a matter of design.

After the web has passed between the slitting rollers 86 and 87 it passes to and between disks for cutting the edge portions of the web transversely to provide seam flaps therein. These transverse cutting disks are indicated at 100 and 101. The disks 100 are mounted on the shaft 94 and the disks 101 on a shaft 101'. In the periphery of the disks 100 there are recesses 102 and 103, and adjacent the recess 102 a stripper pin 104 is fitted in the periphery of each disk 100. In suitable positions in each disk 101, knives 105 and 106 are fixed so as to cooperate respectively with the recesses 103 and 102 to make the short transverse cuts in the edge portions of the web as indicated at 107 and 108, providing the seam flaps 109 and 110 for the envelope as hereinafter described. These cutter disks 100 and 101 consequently complete the cuts for the side strips or waste strips as the same are cut from the edge portions of the web. As will now be understood, after the forward transverse cut 107 is made the stripper pin enters the waste strip by puncturing the same and in the continued revolution of the disk 100 it carries the strip along with it and beneath a roller 111 preferably made of yielding material so as to maintain the strip in position against the surface of the disk until the strip reaches the stripper finger 112 by which it is removed from the pin and the surface of the disk so that it may fall into a receptacle provided for this purpose. After the web has passed between the cutter disks 100 and 101 it is carried to and through a folder device 113 by which the seam flaps 109 and 110 are folded along lines 114 so as to lie against the inner surface of the web as indicated in Fig. 19 of the drawing.

After the seam flaps have been folded to position, the web is carried to and passes between transverse cutting and creasing devices. These devices include a cutter roller 115 and a roller 116 cooperating therewith. These rollers are preferably so designed that the roller 115 makes two revolutions to one of the roller 116, the roller 115 being suitably journaled on a shaft 117 and the roller 116 on a shaft 118. Mounted in the roller 115 there is a transversely arranged knife 119, and also creaser blades 120 and 121. In the periphery of the roller 116 and in oppositely disposed positions there are cutter blocks 122 and 123 cooperating with the knife 119, and also suitable recesses or grooves 124 and 125 cooperating with the creaser blade 120, and similar recesses or grooves 126 and 127 cooperating with the creaser blade 121. The knife 119 is preferably angular so as to make an angular cut 128 across the web as indicated for example in Fig. 20, and also in suitable positions the edge of the knife may be provided with notches to provide small tabs or fingers 129 in the edges of the material so that the cut does not completely sever the parts of the bag from the web. This, however, is purely optional, as the knife edges may be continuous and a continuous cut be made to sever the material or bag from the web at one operation.

After sufficient material in the web to form approximately one side of the envelope or bag has passed between the rollers 115 and 116, the edge portions of the bag are engaged by grippers which as illustrated in Figs. 10 and 11, engage the peripheral portions of the roller 116 and clamp the edge portions of the web thereto, this clamping taking place immediately before this portion of the web passes between the rollers 115 and 116. The apparatus is provided with two sets of these gripper devices but only one of them is illustrated. However, each set of gripper devices comprises a slide member 130 with a finger 131 at the end thereof and at substantially right angles thereto so as to overhang the edge of the roller 116 and to bear upon that portion of the edge of the web lying between the same and the surface of the roller. The slide member of the gripper is mounted to reciprocate in a yoke 132 which is carried by the roller 116, and this slide member 130 carries a cam roller 133 cooperating with a fixed cam 134 by which against the action of a spring 135 the gripper is operated at the proper time to open to receive, and to close to clamp the web between the finger 131 and the surface of the roller 116. The point at which the web is thus engaged is indicated at 136 in Figs. 19 and 20.

In order to apply the necessary adhesive to the edge portions of the web and the seam flaps, there are glue rollers 137 mounted on a shaft 138 and bearing against rollers 139 which extends into a glue receptacle 140 so as to transfer the glue or other adhesive from the surface of the rollers 139 to the surface of the rollers 137 by which this glue or other adhesive is applied to the edge portions of the web as indicated in Fig. 21. This action takes place while the web is clamped by the gripper members as hereinbefore described. The glue rollers 137 is provided with notched or cutaway portions 141 in the surface thereof so that none of the glue or other adhesive is applied to that portion of the web which subsequently is to form the flap of the envelope or bag.

The roller 116 is fitted with suitable devices for preventing the web through adhesion due to static or other conditions from clinging to the surface of the roller. These devices are also employed in pairs and fitted in oppositely disposed positions in the roller 116. Each of them consists in a lever 142 mounted so as to turn on a stub shaft 143 and caused to swing by a cam roller 144 operating in a cam groove 145. The lever 142 is provided with a segment gear 146 meshing with a like gear 147 on a lever 148 pivotally mounted at 149 so that at a predetermined time in the revolutions of the lever 116 the lever 114 is caused to swing in a counterclockwise direction to actuate the lever 148 in a clockwise direction so as to swing the free end of the lever 148 and a lug 150 mounted thereon to positions which are exterior of the periphery of the roller 116 so as to engage the web or paper stock and to thereby free the same from the surface of the roller.

In the operation of the parts of the apparatus hereinbefore last described, the fingers 131 of the grippers pass the roller 115 and the glue roller 137 by entering suitable recesses provided for this purpose in the surface of these rollers. As indicated in Fig. 10, immediately after the web has been engaged by the grippers and has passed between the rollers 115 and 116 the creaser 120 cooperates with the recess 124 to make a transverse crease line 151 in the web. This crease line is at the inner end of the seam flaps and is the crease line at the base or bottom of the envelope or bag. After the web has traveled a predetermined further distance between the rollers 115 and 116, the creaser blade 121 cooperates with the recess 126 to make a transverse crease 152 in the web. This crease is at the other end of the seam flaps and between the same and the end flap of the envelope. After passing through between the rollers 115 and 116 the knife 119 is brought into play and cooperating with the block 122 makes a transverse cut 153 in the web, severing therefrom either wholly or partially the material from which an envelope or paper bag is to be made. It will be noted here that the reinforcing strips 154 have been so placed and secured to the inner surface of the web that the crease line 151 extends between the same, and that the cut line 153 also severs the section of reinforcing material so as to provide a part 155 which is secured to the obverse side 156 of the envelope, and a part 157 which is secured to both the reverse side 158 and the end flap 159 of the envelope. It will be understood therefore, that the material for two envelopes or paper bags is cut from the web with each revolution of the rollers 115 and 116.

As the web prepared as hereinbefore described and cut transversely to provide the material for an envelope or bag continues its travel through the apparatus, the obverse end of the envelope is the forward end. As the envelope blank is advanced by the roller 116 and the gripper fingers 131 the advanced or obverse end of the envelope blank is freed from the roller 116 by the movement of the levers 148 as hereinbefore described, and this forward end of the envelope blank as it advances is caused to lie upon an inclined table 160 as shown in Fig. 2. The gripper fingers continue to carry the envelope blank as the roller 116 continues to revolve and the reverse side of the envelope 158 and the flap 159 extending therefrom when free from the glue roller 137 are also free to fall and lie upon that portion of the obverse side on the inclined table 160. This action folds the blank on the crease line 151. The blank is thus carried between the roller 116 and delivery rollers 161 cooperating with other delivery rollers 162. The delivery rollers 161 are fitted with grippers 163. These grippers are carried by a rocker shaft 164 actuated by a pinion 165 and a segment gear 166 at one end of a lever 167, the opposite end of which is pivotally mounted as indicated at 168 in the delivery rollers 161. The lever 167 carries a cam roller 169 which by suitable means is normally maintained in position against the surface of a stationary cam 170. The timing and operation of these parts is such that immediately upon the envelope blank being carried between the roller 116 and the delivery rollers 161 when the gripper fingers 131 are released, the grippers 163 engage the transverse edge of the envelope in a position as indicated at 171 in Fig. 22. The delivery rollers 161 and 162 are fitted with squeezer blocks 172 and 173 which cooperate to finally form the crease at the closed end of the envelope and when thus creased, the grippers 163 are released and the delivery rollers continue to advance the envelope blank to auxiliary feed rollers 174 and 175 which advance the blank to the position in which the punching die is operated to make the hole and cut the tongue in those portions of the reinforced sections of the blank as hereinafter described. It will be understood of course, that by passing between the roller 116 and the delivery rollers 161, and also between the delivery rollers 161 and 162, the edges of the obverse member of the envelope are pressed into contact with the seam flaps causing the adhesive applied thereto to properly spread and to assist the same in becoming set.

As the envelope or bag is moved forward by the delivery rollers 161 and 162 and the auxiliary feed rollers 174 and 175 it travels on a suitable support 176. The envelope is moved forward along the support by the auxiliary feed rollers 174 and 175 until it engages with sets of feed rollers 177 and 178, it being understood that the relationship between the position of the auxiliary feed rollers 174 and 175 and the length of the envelope is such as to make this possible. The feed rollers 178 are mounted in a fixed frame 179 and are driven through any suitable train of gears. The feed rollers 177 are mounted in a movable frame 180. This frame 180 is fitted with a stop member 181 against which the folded end or base of the envelope contacts and this stop assists in placing the envelope in its proper position for being punched as hereinafter described. To also insure the proper placing of the envelope for the punching operation, I may employ an arm 182 carried by a rocker shaft 183 and actuated by any suitable means to engage the other or flap end of the envelope or bag to coact with the stop 181 and the side guide members 184 to accomplish this purpose. With the envelope or bag in this position for punching the hole therein, and providing the slitted tongue in the flap or otherwise providing a closure device for the open end of the envelope, the frame 180 is moved upwardly a slight distance to stop the further forward movement of the envelope. The frame 180 is thus moved through suitable rods 185 connected adjustably as to length in one arm of a bell crank lever 186 which is pivotally mounted at 187, and at the end of the other arm of which there is a cam roller 188 adapted to coact with a cam 189 to swing the lever and raise the frame as will be readily understood.

With the envelope in this position in the apparatus as illustrated, a hole is cut to provide a handle therein, and simultaneously in the flap a tongue is defined by oppositely disposed slits and an intermediate crease line so that when the flap is turned over to close the open end of the envelope the ends of the tongue may be flexed through the opening to lock the flap in position. The cutting die as illustrated, preferably comprises a head 190 operating in guideways or slideways 191 and 192. Suitably connected to the head 190 is a punch 193 and also a punch 194. Mounted in the frame of the machine beneath the punch members 193 and 194 is the bed plate 195 of the die associated with which there is a stripper plate 196. The bed plate as will be understood has suitable apertures therein which coact with the punches so that the punch 193 makes a hole 197 as illustrated in Figs. 23 and 24, which hole passes through the obverse and reverse sides of the envelope and also through the reinforcing strips or sections 155 and 157 as secured thereto. The punch 194 at the same time the punch 193 is operated, cuts the slits 198 and 199 in the flap and forms the crease or fold line 200 connecting the same to provide a tongue 201 in the flap 159. As indicated in the drawing, the slits 198 and 199 are preferably made to run longitudinally for a predetermined short distance and then are curved toward each other, and also as will be noted the hole 197 is so shaped that the outer portion thereof, that is the portion adjacent the flap is shorter than the inner portion thereof, whereby the ends of the tongue 201 cut in the flap may be readily flexed through the opening 197 and the end portions of the slits caused to engage with the angular portion of the opening 197 to lock the flap in position. The head and punch members of the die are reciprocated vertically by connecting rods 202, each connected at its upper end to the head 190 by a pin 203 and at its opposite end to a crank pin 204 mounted in a crank shaft 205 suitably secured to turn with a shaft 206. All these parts are so timed that as each envelope is positioned beneath the die the parts of the die are actuated to perform the operations hereinbefore described.

After the die has been operated the movable frame 180 is lowered by the cam roller 188 running off the high face of the cam 189 and immediately the envelope is moved forward again. The forward end of each envelope as thus moved further by the feed rollers 177 and 178, is engaged by delivery grippers, and the envelopes are placed in piles in predetermined numbers and progressively advanced so that they may be removed by the operator. The devices for accomplishing this, as illustrated, comprise delivery rollers 207 mounted on a shaft 208. Each of these delivery rollers carries a pinion 209 which operates a gripper 210. Each pinion 209 meshes with a segment rack 211 at the free end of a lever 212 pivotally mounted as indicated at 213 at its opposite end in the corresponding delivery roller 207. Each lever 212 is fitted with a cam roller 214 bearing against the face of a fixed cam 215 so that as the envelope is again advanced by the feed rollers 177 and 178, the forward edge thereof is engaged by the grippers 210 and the envelope is conveyed as thus gripped until the grippers reach a point immediately before coming to a stop member 216 when the grippers are opened, the envelope released, and by the action of the stop member 216, is caused to fall upon a belt 217 or upon a number of envelopes previously deposited in a pile on the said belt. This belt 217 passes around pulleys 218, but one of which is shown in the drawing, each pulley 218 being mounted on a shaft 219. On the shaft 219 there is also a ratchet 220. This ratchet 220 is engaged by a pawl 221 carried by a lever 222. One end of the lever 222 is mounted to turn on the shaft 219. The opposite end of the lever 222 is pivotally connected to one end of a link 223. Pivotally connected at its other end in a disk carried by the shaft 208 or to the delivery wheel 207. Cooperating with the ratchet 220 is a pawl 224 pivotally mounted on one end of a bar 225 which at its opposite end is pivotally connected in a lug 226 as indicated at 227. On the bar 225 there is a cam roller 228 cooperating with a cam 229 mounted on a stub shaft 231 suitably secured in the frame of the machine. The cam roller 228 is maintained against the face of the cam 229 by a spring 230 or otherwise. Also mounted on the stub shaft 231 is a counting ratchet 232. A rod 233 is pivotally connected as indicated at 234 to the adjacent ends of the lever 222 and the link 223, this pivotal point being the same that connects the ends of this lever and link. At one end the rod 233 is provided with a pawl 235 for engagement with the teeth of the ratchet 232 and at its opposite end this rod 233 is provided with a loop 236 which receives a pin 237 for determining the movement of the rod. Any suitable counter or recording mechanism may be connected to the stub shaft 231 in order to automatically count the number of envelopes or bags made by the machine. In the operation of this delivery device as will now be understood, the envelopes or bags are delivered and placed in superimposed piles of a predetermined number depending upon the number of teeth in the ratchet 232, the ratchet being advanced one tooth every time an envelope is delivered, which is every time the delivery rollers 207 make a complete revolution. In this movement the pawl 221 fails to engage the next succeeding tooth of the ratchet 220, because normally the pawl 224 is in engagement with this next succeeding tooth. When however, the ratchet 232 has made a complete revolution the cam 229 coacting with the cam roller 228 swings the bar 225 against the action of the spring 230 so as to remove the pawl 224 from the next succeeding tooth of the ratchet 220, thereby permitting the pawl 221 to engage this next succeeding tooth and to impart a partial revolution to the ratchet 220 to advance the delivery belt 217 a predetermined distance.

In the operation of the machine hereinbefore described, envelopes or bags of paper or other material are successively made from a traveling web of suitable stock. The envelope stock or material is fed from a roll and preferably carried over devices for uncurling the stock when necessary, as hereinbefore described, the travel of the stock being effected by the feed rollers 44 and 45. During its travel from the roll from which the stock is taken to the feed rollers by which it is moved, the upper or outer surface which is the inner surface in the completed article, has glue or other adhesive applied thereto at predetermined intervals and over the required amount of surface by the glue or adhesive applying roller 54, by the operation of the bell crank lever 55, the link 57, the cam 60, and the parts associated therewith for actuating the glue roller. As shown in Fig. 2, the quantity of the glue or adhesive thus applied may be regulated by a scraping knife 238 mounted in a plate 239 and adjustable to position relatively to the roller 63 in order to regulate the quantity of the adhesive carried by the roller 63 to the glue roller 54. Simultaneously with the feed of the envelope stock there is also fed a web of reinforcing stock. This reinforcing stock is taken from the roll 68 and the web 69 is fed therefrom by feed rollers 70 and 71. These feed rollers cause the web 69 to travel at a materially slower speed than that of the web 35. During the travel of the web 69 the same is cut into predetermined lengths to form the reinforcing members 154 which are of substantially the same extent as the surface to which the adhesive is applied to the traveling web of envelope stock. These traveling webs are brought together and united as they enter the feed rollers 44 and 45 so as to pass simultaneously between the same. The parts are so timed as will be understood that each reinforcing member 154 is caused to register with the surface of the envelope stock to which the adhesive has been applied, the web of reinforcing material being cut transversely by the cutter rollers 73 and 74 at substantially the same time that the forward end of each reinforcing strip enters between the feed rollers 44 and 45, so that in passing between these feed rollers the successive reinforcing strips are secured to the web of envelope material as illustrated in Fig. 16 of the drawing.

In the machine as illustrated, the traveling web after leaving the feed rollers 44 and 45, passes through printing cylinders 79 and 80 by which advertisements or other printed matter may be printed on the surface of either or both of the obverse and reverse members of the envelope or bag to be formed. After passing through the printing cylinders, the web is provided with the longitudinally disposed slits 96 and 97 as indicated in Figs. 6 and 17 in the drawing, by the slitting rollers 86 and 87 and the parts associated therewith, as illustrated in Figs. 4 and 5, and as hereinbefore described. In the next step the web is carried between the cutting disks 100 and 101 and the transverse cuts 107 and 108 made in the edge thereof, and the waste strips thus cut from the edge of the web removed therefrom, providing in the web in oppositely disposed pairs at predetermined intervals the seam flaps 109 so that the web is then in the form as indicated in Fig. 18.

After having passed between the cutting disks 100 and 101, the web next travels through the edge folding device 113 by which the seam flaps are folded over to the positions as shown in Fig. 19. With the web in this condition it passes to and between the transverse creasing, cutting and adhesive applying devices as particularly illustrated in Fig. 10 of the drawing. In passing between these members the edges of the web are engaged between the gripper fingers 131 and the surface of the roller 116, and the creaser blade 120 operates to make the crease line 151 which extends transversely of the web at the forward end of the seam flaps 109. During the continued travel of the web the glue roller 137 applies adhesive to the edge portions thereof as indicated in Fig. 21, and after a further travel of the web the creaser blade 121 operates to make the crease line 152 which extends transversely of the web at the other end of the seam flaps 109. Then and after a further travel of the web, the knife 119 operates to cut the web transversely, severing therefrom a blank to form an envelope.

As hereinbefore described, the forward end of the envelope blank is the obverse member 156 thereof, and to prevent this forward end of the blank from adhering to the surface of the roller 116, the levers 148 are operated so that during the continued revolution of the roller 116, this forward end of the blank enters and lies upon the inclined table or support 160, and as the extremity of the reverse side of the blank with the flap extension is freed from the glue roller and with the continued movement of the roller 116, it turns over and falls upon the obverse member of the blank. After the roller 116 has traveled sufficiently far to carry the edge of the thus folded blank between the same and the delivery roller 161, the gripper fingers 131 are released and the grippers 163 operated to engage the folded transverse edge of the blank and to carry the same between the delivery roller 161 and the cooperating delivery roller 162 where this transverse edge is squeezed or flattened by the blocks 172 and 173 and the grippers 163 released, the blank is carried forward by the delivery rollers 161 and 162 to the auxiliary feed rollers 174 and 175, and by these auxiliary feed rollers to the feed rollers 177 and 178 where by the stop 181 and the parts coacting therewith, the blank is positioned for the operation of the punching die as hereinbefore described, and by which the openings or holes 197 and the slits 198 and 199 on the tongue 201 are formed therein, the feed rollers 177 and 178 being separated in order that the envelope may be stationary after coming against the stop 181 and during the punching operation. After the envelope is punched the feed rollers 177 and 178 again carry the same forward to the delivery rollers 207 by which on the parts cooperating therewith they are placed in superimposed piles and periodically advanced upon and by the conveyor belt 217 from which as will be understood they may be removed by and at the convenience of the operator.

I claim as my invention:

1. In a machine for making envelopes, bags, and the like, from a traveling web of material, feed rollers for moving the web of material, cutter rollers mounted on fixed axes, levers, cutter rollers having circular knives mounted in the said levers, means for swinging the said levers to raise and lower the said cutting knives for making longitudinal slits of predetermined length adacent the edges of the moving web at predetermined intervals therein, means for transversely cutting the edges of the moving web at the ends of the slit portions to cut strips therefrom and to provide seam flaps therein, and means for removing the strips cut from the edge portions of the moving web of material.

2. In a machine for making envelopes, bags, and the like, from a traveling web of material, feed rollers for moving the web of material, cutter rollers mounted on fixed axes, levers, cutter rollers having circular knives mounted in the said levers, means for swinging the said levers to raise and lower the said cutting knives for making longitudinal slits of predetermined length adjacent the edge of the moving web at predetermined intervals therein, means for transversely cutting the edges of the moving web at the ends of the slit portions to cut strips therefrom and to provide seam flaps therein, means for removing the strips cut from the edge portions of the moving web of material, and means for folding the seam flaps over on the traveling web.

3. In a machine for making envelopes, bags, and the like, from a traveling web of material, feed rollers for moving the web of material, cutter rollers mounted on fixed axes, levers, cutter rollers having circular knives mounted in the said levers, means for swinging the said levers to raise and lower the said cutting knives for making longitudinal slits of predetermined length adjacent the edges of the moving web at predetermined intervals therein, cutter disks and knives mounted therein for transversely cutting the edge portions of the web at the ends of the slits to cut sections therefrom and to provide seam flaps therein, and means for removing the strips cut from the edge portions of the moving web of material.

4. In a machine for making paper envelopes, bags, and the like, from a traveling web of material, devices for cutting strips from the edges of the web to provide seam flaps therein and folding said seam flaps over on the web, devices for creasing the web at one end of the seam flaps, devices for creasing the web at the other end of the seam flaps, means for cutting the web beyond the last aforesaid crease line to provide for an envelope blank having an end closure flap, devices for applying adhesive to the said seam flaps, means for gripping and folding the blank along the first aforesaid crease line, and devices for punching an opening in the envelope blank and simultaneously forming a tongue in the end closure flap.

5. In a machine for making paper envelopes, bags, and the like, from a traveling web of material, devices for cutting strips from the edges of the web to provide seam flaps therein and folding said seam flaps over on the web, devices for creasing the web at one end of the seam flaps, devices for creasing the web at the other end of the seam flaps, means for cutting the web beyond the last aforesaid crease line to provide for an envelope blank having an end closure flap, devices for applying adhesive to the said seam flaps, means for gripping and folding the blank along the first aforesaid crease line, devices for punching an opening in the envelope blank and simultaneously forming a tongue in the end closure flap, and means for delivering the envelope from the machine.

6. In a machine for making paper envelopes, bags, and the like, from a traveling web of material, means for feeding and affixing strips of reinforcing material to the said web in predetermined spaced positions, devices for cutting and removing strips from the edges of the web to provide seam flaps and folding the said seam flaps over on the web, devices for creasing the web at one end of the seam flaps, means for cutting the web transversely to form an envelope blank, and means for gripping and folding the blank at the said crease line.

7. In a machine for making paper envelopes, bags, and the like, from a traveling web of material, means for feeding and affixing strips of reinforcing material to the said web in predetermined spaced positions, devices for cutting and removing strips from the edges of the web to provide seam flaps and folding the said seam flaps over on the web, devices for creasing the web at one end of the said seam flaps, devices for creasing the web at the other end of the said seam flaps, means for cutting the web transversely to provide an end flap therein, means for applying adhesive to the said seam flaps, and devices for gripping and folding the blank along the first aforesaid crease line.

8. In a machine for making paper envelopes, bags, and the like, from a traveling web of material, means for feeding and affixing strips of reinforcing material to the said web in predetermined spaced positions, devices for cutting strips from the edges of the web to provide seam flaps and folding the said seam flaps over on the web, devices for creasing the web at one end of the said seam flaps, devices for creasing the web at the other end of the said seam flaps, means for cutting the web at a reinforced portion thereof to form an envelope blank having a reinforced closure flap, means for applying adhesive to the said seam flaps, and means for gripping and folding the blank along the first aforesaid crease line.

9. In a machine for making paper envelopes, bags, and the like, from a traveling web of material, means for feeding and affixing strips of reinforcing material to the said web in predetermined spaced positions, devices for cutting strips from the edges of the web to provide seam flaps and folding the said seam flaps over on the web, devices for creasing the web at one end of the said seam flaps, devices for creasing the web at the other end of the said seam flaps, means for cutting the web at a reinforced portion thereof to form an envelope blank having a reinforced closure flap, means for applying adhesive to the said seam flaps, means for gripping and folding the blank along the first aforesaid crease line, and devices for punching an opening in the envelope and providing a tongue in the reinforced portion of the closure flap.

10. In a machine for making paper envelopes, bags, and the like, from a traveling web of material, means for feeding and affixing strips of reinforcing material to the said web in predetermined spaced positions, devices for cutting strips from the edges of the web to provide seam flaps and folding the said seam flaps over on the web, devices for creasing the web at one end of the said seam flaps, devices for creasing the web at the other end of the said seam flaps, means for cutting the web at a reinforced portion thereof to form an envelope blank having a reinforced closure flap, means for applying adhesive to the said seam flaps, means for gripping and folding the blank along the first aforesaid crease line, devices for punching an opening in the envelope and providing a tongue in the reinforced portion of the closure flap, and means for delivering the envelope from the machine.

11. In a machine for making paper envelopes, bags, and the like, from a traveling web of material, having reinforced sections at predetermined spaced intervals therein, devices for cutting strips from the edges of the web to provide seam flaps and folding the said seam flaps over on the web, devices for creasing the web at one end of the said seam flaps, devices for creasing the web at the other end of the said seam flaps, means for cutting the web at a reinforced portion thereof to form an envelope blank having a reinforced closure flap, means for applying adhesive to the said seam flaps, means for gripping and folding the blank along the first aforesaid crease line, and devices for punching an opening in the envelope and providing a tongue in the reinforcing portion of the closure flap.

12. In a machine for making paper envelopes, bags, and the like, from a traveling web of material, having reinforced sections at predetermined spaced intervals therein, devices for cutting strips from the edges of the web to provide seam flaps and folding the said seam flaps over on the web, devices for creasing the web at one end of the said seam flaps, devices for creasing the web at the other end of the said seam flaps, means for cutting the web at a reinforced portion thereof to form an envelope blank having a reinforced closure flap, means for applying adhesive to the said seam flaps, means for gripping and folding the blank along the first aforesaid crease line, devices for punching an opening in the envelope and providing a tongue in the reinforced portion of the closure flap, and means for delivering the envelope from the machine.

13. In a machine of the class described, devices for feeding envelope material from a roll, devices for applying reinforcing sections at predetermined intervals thereto, devices for cutting oppositely disposed edge sections from the web to provide seam flaps therein, devices for turning the seam flaps over on to the web, devices for applying adhesive to the said seam flaps, devices for creasing and cutting the web to form an envelope blank and transversely folding the blank to form an envelope having an end closure flap, and devices for providing a cooperating closure means between the end closure flap and the adjacent portions of the envelope.

14. In a machine for making envelopes, bags and the like, from a traveling web of material, means for moving the web, devices for feeding a web of reinforcing material, means for cutting predetermined lengths from the web of reinforcing material and applying the same to the aforesaid traveling web of material, devices for cutting and removing oppositely disposed strips from the edge portions of the said traveling web of material to provide intermediate and oppositely disposed seam flaps therein, means for turning the seam flaps over on the traveling web of material, means for severing the traveling web of material transversely through a section of reinforcing material applied thereto to provide an envelope blank having reinforced sections at the ends of the envelope, and means for folding the envelope blank adjacent corresponding ends of the seam flaps to bring portions of the reinforced sections in juxtaposed positions at the other end of the envelope.

15. In a machine for making envelopes, bags and the like, from a traveling web of envelope material, means for moving the said web, means for feeding a web of reinforcing material, means for cutting sections of predetermined length therefrom and applying each section as cut from the web of reinforcing material to the traveling web of envelope material so that the sections of reinforcing material are connected in spaced positions to the web of envelope material, means for cutting oppositely disposed strips from the edge portions of the web of envelope material to provide intermediate seam flaps, means for turning the seam flaps over on the web of envelope material, means for creasing the web of envelope material transversely at the ends of the seam flaps, means for transversely severing the web of envelope material through a section of the reinforcing material to form an envelope blank having reinforced sections at the ends thereof, and means for folding the envelope blank to bring portions of the reinforced sections at the ends thereof into juxtaposed positions.

16. In a machine for making envelopes, bags and the like, from a traveling web of envelope material, feed rollers for moving the web of envelope material, feed rollers for simultaneously moving a web of reinforcing material, means for cutting predetermined lengths from the web of reinforcing material and applying the same to the web of envelope material so that the lengths cut from the web of reinforcing material are connected in spaced positions to the web of envelope material, cutter rollers for making longitudinal slits in the web of envelope material adjacent the edges thereof, means for transversely cutting the edge portions of the web of envelope material at the ends of the slits and for removing therefrom the strips so cut in order to form seam flaps in the edge portions of the web of envelope material, means for folding the seam flaps over on to the web of envelope material, means for transversely severing the web of envelope material through a reinforced section thereof to provide an envelope blank having reinforced portions at the opposite ends thereof, and means for folding the envelope blank to bring parts of the reinforced portions thereof into juxtaposed positions.

17. In a machine for making envelopes, bags and the like, from a traveling web of envelope material, feed rollers for moving the web of envelope material, feed rollers for simultaneously moving a web of reinforcing material, means for cutting predetermined lengths from the web of reinforcing material and applying the same to the web of envelope material so that the lengths cut from the web of reinforcing material are connected in spaced positions to the web of envelope material, cutter rollers for making longitudinal slits in the web of envelope material adjacent the edges thereof, means for transversely cutting the edge portions of the web of envelope material at the ends of the slits and for removing therefrom the strips so cut in order to form seam flaps in the edge portions of the web of envelope material, means for folding the seam flaps over on to the web of envelope material, means for creasing the web of envelope material at the ends of the seam flaps, devices for applying adhesive to the seam flaps, means for transversely severing the web of envelope material through a reinforced section thereof to provide an envelope blank having reinforced portions at the opposite ends thereof, and means for folding the envelope blank to bring parts of the reinforced portions thereof into juxtaposed positions.

18. In a machine for making envelopes, bags and the like, from a traveling web of envelope material, feed rollers for moving the traveling web of envelope material, feed rollers for moving a web of reinforcing material, means for cutting predetermined lengths from the web of reinforcing material and applying the same at spaced intervals to the said web of envelope material, cutter rollers having circular cutting knives, levers on which the said cutter rollers are mounted, means for swinging the levers to raise and lower the cutter rollers for making longitudinal slits of predetermined length adjacent the edges of the moving web of envelope material and at predetermined intervals therein, means for transversely cutting the edges of the moving web of envelope material at the ends of the slit portions to cut strips therefrom and to provide seam flaps therein, means for folding the seam flaps over on to the web of envelope material, means for severing the web of envelope material transversely through a section of reinforcing material to provide an envelope blank having reinforced sections at opposite ends thereof, and means for folding the envelope blank to bring portions of the reinforced sections at the ends thereof into juxtaposed positions.

19. In a machine for making envelopes, bags and the like, from a traveling web of envelope material, feed rollers for moving the traveling web of envelope material, feed rollers for moving a web of reinforcing material, means for cutting predetermined lengths from the web of reinforcing material and applying the same at spaced intervals to the said web of envelope material, cutter rollers having circular cutting knives, levers on which the said cutter rollers are mounted, means for swinging the levers to raise and lower the cutter rollers for making longitudinal slits of predetermined length adjacent the edges of the moving web of envelope material and at predetermined intervals therein, means for transversely cutting the edges of the moving web of envelope material at the ends of the slit portions to cut strips therefrom and to provide seam flaps therein, means for folding the seam flaps over on to the web of envelope material, means for creasing the web transversely at the ends of the seam flaps, means for applying adhesive to the seam flaps, means for severing the web of envelope material transversely through a section of reinforcing material to provide an envelope blank having reinforced sections at opposite ends thereof, and means for folding the envelope blank to bring portions of the reinforced sections at the ends thereof into juxtaposed positions.

20. In a machine for making envelopes, bags and the like, from a traveling web of envelope material, feed rollers for moving the web of envelope material, feed rollers for moving a web of reinforcing material, means for severing predetermined lengths of reinforcing material and applying the same in spaced positions to the said web of envelope material, cutter rollers, levers on which the cutter rollers are mounted, means for swinging the said levers to raise and lower the cutter rollers for making longitudinal slits of predetermined length adjacent the edges of the web of envelope material at intervals therein, cutter disks and knives for transversely cutting the edge portions of the web of envelope material at the ends of the slits to cut sections therefrom and to thereby provide seam flaps therein, means for turning the seam flaps over on to the traveling web of envelope material, means for transversely severing the web of envelope material through a reinforced section thereof to provide an envelope blank having reinforced sections at the ends thereof, and means for folding the said envelope blank to bring portions of the said reinforced end sections thereof into juxtaposed positions.

21. In a machine for making envelopes, bags and the like, from a traveling web of envelope material, feed rollers for moving the web of envelope material, feed rollers for moving a web of reinforcing material, means for severing predetermined lengths of reinforcing material and applying the same in spaced positions to the said web of envelope material, cutter rollers, levers on which the cutter rollers are mounted, means for swinging the said levers to raise and lower the cutter rollers for making longitudinal slits of predetermined length adjacent the edges of the web of envelope material at intervals therein, cutter disks and knives for transversely cutting the edge portions of the web of envelope material at the ends of the slits to cut sections therefrom and to thereby provide seam flaps therein, means for turning the seam flaps over on to the traveling web of envelope material, means for creasing the web of envelope material transversely at the ends of the seam flaps, means for applying adhesive to the said seam flaps, means for transversely severing the web of envelope material through a reinforced section thereof to provide an envelope blank having reinforced sections at the ends thereof, and means for folding the said envelope blank to bring portions of the said reinforced end sections thereof into juxtaposed positions.

22. In a machine for making envelopes, bags and the like, from a traveling web of envelope material, devices for moving the web of envelope material, devices for feeding a web of reinforcing material, means for cutting predetermined lengths from the web of reinforcing material and applying the same at spaced intervals to the said web of envelope material, devices for cutting strips from the edges of the web of envelope material to provide seam flaps therein, means for folding the said seam flaps over on to the web of envelope material, means for transversely cutting the web of envelope material through a reinforced section thereof and appreciably beyond the corresponding ends of oppositely disposed seam flaps to provide an envelope blank having a reinforced section at one end thereof and a reinforced section with a reinforced end closure flap at the other end thereof, and devices for folding the envelope blank at the opposite ends of the seam flaps to bring the reinforced end sections of the envelope into juxtaposition with the reinforced end closure flap extending beyond the same.

23. In a machine for making envelopes, bags and the like, from a traveling web of envelope material, devices for moving the web of envelope material, devices for moving a web of reinforcing material, means for cutting sections of predetermined length from the web of reinforcing material and applying the same in spaced positions to the web of envelope material to form reinforced sections therein, means for transversely severing the web of envelope material through one of the reinforced sections thereof to provide an envelope blank having a reinforced section at one end thereof and a reinforced section with a reinforced end closure flap at the other end thereof, and means for folding the envelope blank to bring the reinforced end sections thereof into juxtaposition with the reinforced end closure flap projecting beyond the same.

24. In a machine for making envelopes, bags and the like, from a traveling web of envelope material, means for feeding and affixing strips of reinforcing material in spaced positions to the said web of envelope material, devices for cutting strips from the edges of the web of envelope material to provide seam flaps therein, means for cutting the web of envelope material transversely through a reinforced section to provide an envelope blank having reinforced end sections, means for folding the envelope blank to bring the reinforced end sections thereof into juxtaposition, and means for forming a cooperating closure in the said reinforced end sections.

25. In a machine for making envelopes, bags and the like, from a traveling web of envelope material, means for moving the web of envelope material, means for feeding and affixing reinforcing material to the said web of envelope material, devices for cutting strips from the edges of the web of envelope material to provide seam flaps therein, means for folding the seam flaps over on to the web of envelope material, devices for creasing the web of envelope material at one end of the seam flaps, means for transversely severing the web of envelope material through a reinforced section thereof to form an envelope blank having reinforced end sections therein, means for folding the envelope blank at the said crease line, and devices for forming a cooperating closure means in the said reinforced end sections.

26. In a machine for making envelopes, bags and the like, from a traveling web of envelope material, devices for moving the web of envelope material, means for feeding and affixing strips of reinforcing material in spaced positions to the said web of envelope material, devices for cutting strips from the edges of the web of envelope material to provide oppositely disposed seam flaps therein, means for folding the said seam flaps over on to the web of envelope material, means for creasing the web of envelope material at one end of the said seam flaps, devices for creasing the web of envelope material at the other end of the seam flaps, means for transversely severing the web at a reinforced portion thereof to form an envelope blank having a reinforced section at one end thereof and a reinforced section and a reinforced end closure flap at the other end thereof, means for folding the blank along the first aforesaid crease line, and devices for forming a cooperating closure means between the said reinforced closure flap and the said reinforced adjacent end sections.

27. In a machine for making envelopes, bags and the like, from a traveling web of envelope material, devices for moving the web of envelope material, means for feeding and affixing strips of reinforcing material in spaced positions to the said web of envelope material, devices for cutting strips from the edge of the web of envelope material to provide oppositely disposed seam flaps therein, means for applying an adhesive to the said seam flaps, means for folding the said seam flaps over on to the web of envelope material, means for creasing the web of envelope material at one end of the said seam flaps, devices for creasing the web of envelope material at the other end of the seam flaps, means for transversely severing the web at a reinforced portion thereof to form an envelope blank having a reinforced section at one end thereof and a reinforced section and a reinforced end closure flap at the other end thereof, means for gripping and folding the blank along the first aforesaid crease line, and devices for forming a cooperating closure means between the said reinforced closure flap and the said reinforced adjacent end sections.

28. In a machine for making envelopes, bags and the like, from a traveling web of envelope material, devices for moving the said web of envelope material, devices for cutting strips from the edges of the web of envelope material to provide seam flaps therein, devices for folding the said seam flaps over on to the web of envelope material, means for cutting the web transversely an appreciable distance from one end of the said seam flaps to form an envelope blank having a closure flap at one end of one side member thereof, means for folding the blank to cause the closure flap to project appreciably beyond the end of the other side member of the envelope when the parts thereof are brought together, and devices for punching an opening in the envelope and providing a cooperating tongue in the said closure flap.

29. In a machine for making envelopes, bags and the like, from a traveling web of envelope material, devices for moving the web of envelope material, means for cutting strips from the edges of the web of envelope material to provide seam flaps therein, means for folding the seam flaps over on to the web of envelope material, devices for creasing the web of envelope material at one end of the seam flaps, devices for creasing the web of the envelope material at the other end of the seam flaps, means for transversely cutting the web appreciably distant from one end of the seam flaps to form an envelope blank having a closure flap, means for folding the blank along the first aforesaid crease line, and devices for forming an opening in the envelope and simultaneously providing a cooperating tongue in the said closure flap.

30. In a machine for making envelopes and the like from a traveling web of material, devices for continuously feeding the envelope material, devices for forming an envelope from the said material, open-edge envelope from the said material, and means for making a handle opening in the envelope adjacent the open edge thereof.

31. In a machine for making envelopes and the like from a traveling web of material, devices for continuously feeding the said material, devices for forming an open edge envelope from the said material, devices for bringing the envelope when formed to a stop in a predetermined position, and devices operative when the envelope is stationary for forming a handle opening in the envelope adjacent the open edge thereof.

32. In a machine for making envelopes and the like from a traveling web of material, means for feeding the material, means for forming an open edge envelope with a closure flap, and means for forming a handle opening adjacent the edge of the envelope having the closure flap extending therefrom.

33. In a machine for making envelopes and the like from a traveling web of material, devices for feeding the material, devices for forming an open edge envelope having a closure flap extending therefrom, and means for simultaneously forming a handle opening in the envelope and a device in the closure flap for cooperating with the handle opening to close the envelope.

34. In a machine for making envelopes and the like from a traveling web of material, devices for feeding the material, devices for forming an envelope having an open edge and a closure flap extending therefrom, means for bringing the envelope to a stop or stationary position, and devices operative when the envelope is in a stationary position for simultaneously forming a handle opening in the envelope and a device in the closure flap for cooperating with the handle opening to form a closure for the envelope.

35. In a machine for making envelopes and the like from a traveling web of material, devices for feeding the material, devices for feeding the reinforcing material, means for forming an open edge envelope having a strip of reinforcing material on both inner faces of the envelope adjacent the open edge thereof, and means for forming a handle opening extending through the envelope material and the reinforcing strips in a position adjacent the open edge of the envelope.

36. In a machine for making envelopes and the like from a traveling web of material, devices for feeding the material, devices for feeding a reinforcing material, means for forming an envelope from the said materials having an open edge and strips of reinforcing material in both inner faces of the envelope adjacent the open edge thereof, means for bringing the envelope to a stop or stationary position, and means operative when the envelope is in a stationary position for forming a handle opening therein extending through the envelope material and the reinforcing strips adjacent the open edge of the envelope.

37. In a machine for making envelopes and the like from a traveling web of material, means for feeding the material, means for feeding a strip of reinforcing material, devices for forming an envelope having an open edge with a closure flap and strips of reinforcing material on both inner surfaces of the envelope and the adjacent portion of the closure flap, and means for simultaneously forming a handle opening in the envelope material and the reinforcing strips and a device in the closure flap for cooperating with the handle opening to act as a closure for the envelope.

38. In a machine for making envelopes and the like from a traveling web of material, devices for feeding the material, devices for feeding a strip of reinforcing material, means for forming an envelope from the said materials having an open edge and a closure flap extending therefrom with strips of reinforcing material on the inner faces of both sides of the envelope and the adjacent inner portion of the closure flap, means for bringing the envelope to a stop or stationary position, and means operative when the envelope is in a stationary position for simultaneously forming a handle opening in the envelope material and the reinforcing strips adjacent the open edge of the envelope and a device in the closure flap for cooperating with the said handle opening for closing the said envelope.

39. In a machine for making envelopes and the like from a traveling web of material, devices for feeding the material, means for forming an open edge envelope having a closure flap, and means for simultaneously forming a handle opening in the envelope material adjacent the open edge thereof and making a tongue in the closure flap for cooperating with the handle opening to form a closure for the envelope.

40. In a machine for making envelopes and the like from a traveling web of material, devices for feeding the material, devices for feeding a strip of reinforcing material, means for forming an envelope from the said materials having an open edge and a closure flap with strips of reinforcing material on the inner faces of both sides of the envelope and the adjacent inner face of the closure flap, and means for simultaneously punching an opening through the envelope and reinforcing strips adjacent the open edge thereof and forming a tongue in the closure flap to cooperate with the said handle opening thereby forming a closure for the envelope.

41. In a machine for making envelopes and the like from a traveling web of material, devices for feeding the material, devices for forming an envelope having an open edge and a closure flap extending therefrom, means for stopping the envelope when formed, means operative when the envelope is in a stationary position for punching a handle opening adjacent the open edge thereof and forming a tongue in the closure flap for cooperating with the handle opening for forming a closure for the envelope, and means then operative for ejecting the envelope from the machine.

42. In a machine for making envelopes and the like from a traveling web of material, devices for feeding the material, devices for feeding a reinforcing material, means for forming from the said materials an open edge envelope having a closure flap extending therefrom and having reinforcing strips on the inner faces of both sides of the envelope and on the inner face of the said closure flap, means operative after the envelope is formed for bringing the same to a stationary position, means operative when the envelope is in a stationary position for punching a handle opening through the sides and reinforcing strips adjacent the open edge of the envelope and simultaneously forming a tongue in the closure flap and the reinforcing strip associated therewith for cooperating with the handle opening to act as a closure for the envelope, and means then operative for ejecting the envelope from the machine.

Signed by me this 8th day of December, 1925.

MATTHEW VIERENGEL.